United States Patent Office 3,701,829
Patented Oct. 31, 1972

3,701,829
TREATMENT OF PARKINSON'S DISEASE
Giuseppe Bartholini, Basel, Switzerland, assignor to Hoffmann-La Roche Inc., Nutley, N.J.
No Drawing. Filed July 9, 1971, Ser. No. 162,028
Claims priority, application Switzerland, July 24, 1970, 11,235/70
Int. Cl. A61k 27/00
U.S. Cl. 424—319      9 Claims

ABSTRACT OF THE DISCLOSURE

Pharmaceutical compositions for treating Parkinson's disease which contain as the active anti-Parkinsonism ingredient, L-3-(4-hydroxy-3-methoxyphenyl)-alanine, or a hydrate or pharmaceutically acceptable salt thereof, and as an optional ingredient, a peripheral decarboxylase inhibitor, are described. The compositions are useful for the treatment of Parkinson's disease with little or none of the side-effects usually associated with L-dopa.

BACKGROUND OF THE INVENTION

L-dopa alone or in combination with a peripheral decarboxylase inhibitor is used for the treatment of Parkinson's disease and is particularly effective against idiopathic Parkinson's disease. While L-dopa therapy has been of great benefit to many victims of Parkinson's disease, its use has been associated with various undesirable side-effects such as, for example, peripheral adrenergic stimulation, gastrointestinal complaints, involuntary movements and circulatory complaints. There is thus a need for a therapeutic agent effective against Parkinson's disease which does not cause the undesirable side-effects associated with L-dopa.

SUMMARY OF THE INVENTION

The present invention provides methods for treating Parkinson's disease and pharmaceutical compositions useful in such methods.

The invention is carried out by administering orally or parenterally L-3-(4-hydroxy-3-methoxyphenyl)-alanine, a hydrate or a pharmaceutically acceptable salt thereof either alone or in combination with a peripheral decarboxylase inhibitor.

DETAILED DESCRIPTION OF THE INVENTION

It has been found that on administration to patients having Parkinson's disease, particularly those with idiopathic Parkinson's disease, of a pharmaceutical preparation containing as the active ingredient, L-3-(4-hydroxy-3-methoxyphenyl)-alanine, a hydrate or a pharmaceutically acceptable salt thereof, the typical symptoms of the disease such as rigor, akinesia and tremor can be significantly improved or abolished without the simultaneous occurrence of peripheral adrenergic and other undesirable side-effects.

As used herein, the expression "pharmaceutically acceptable salts" means salts with pharmaceutically acceptable acids or bases, e.g., acids such as sulfuric, hydrochloric, nitric, phosphoric, etc. or bases such as alkali or alkaline earth metals, etc. The expression "hydrate" means any of the hydrates which can be formed from the compound, e.g., monohydrate, dihydrate, etc. The preferred hydrate is the monohydrate. The expression "active ingredient" means L-3-(4-hydroxy-3-methoxyphenyl)-alanine or an equivalent amount of a hydrate or pharmaceutically acceptable salt thereof. The expression "peripheral decarboxylase inhibitors" includes the compounds described or an equivalent amount of a pharmaceutically acceptable salt thereof.

It has also been found that the same beneficial results can be obtained when using a peripheral decarboxylase inhibitor in combination with the active ingredient to treat Parkinsonism. This is advantageous since it permits the utilization of less of the active ingredient per dosage to achieve the same effect. Typical suitable peripheral decarboxylase inhibitors which are useful in this invention are those represented by the formula

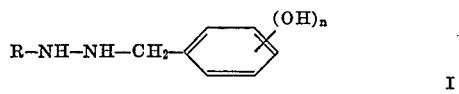

I wherein R is hydrogen, amino lower alkanoyl, amino hydroxy lower alkanoyl and amino aryl lower alkanoyl, $n$ is 2 or 3 and pharmaceutically acceptable salts thereof.

"Aryl" includes phenyl and hydroxy substituted phenyl.

Compounds within the scope of those represented by Formula I which are preferred for use in this invention are $N^1$-D,L-seryl-$N^2$-(2,3,4-trihydroxybenzyl)-hydrazide,
$N^1$-L-seryl-$N^2$-(2,3,4-trihydroxybenzyl)-hydrazide,
$N^1$-glycyl-$N^2$-(2,3,4-trihydroxybenzyl)-hydrazide,
$N^1$-D,L-tyrosyl-$N^2$-(2,3,4-trihydroxybenzyl)-hydrazide, or
$N^1$-L-tyrosyl-$N^2$-(2,3,4-trihydroxybenzyl)-hydrazide and pharmaceutically acceptable salts thereof.

Other typical suitable decarboxylase inhibitors are, for example, benzylideneacetophenone, L - 3-(3,4-dihydroxyphenyl) - 2 - methyl-alanine and compounds represented by the formula

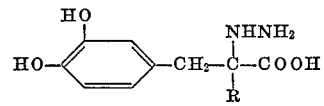

wherein R is hydrogen or lower alkyl.

As compared with L-dopa, which is known as an anti-Parkinson agent, the active ingredient used in the pharmaceutical compositions of this invention, L - 3-(4-hydroxy - 3 - methoxyphenyl)-alanine, a hydrate or pharmaceutically acceptable salt thereof, possesses a depot action and a substantially lower toxicity, i.e., the $DL_{50}$ in the mouse amounts to more than 10,000 mg./kg. p.o. both in the 24-hour and in the 4-day test. Furthermore, upon administration of the pharmaceutical compositions of this invention, the undesirable side-effects which usually occur when L-dopa is administered, namely, gastro-intestinal complaints, involuntary movements and circulatory complaints, do not occur or only occur to a very slight extent.

The invention is carried out by administering the active ingredient either orally or parenterally. The preferred oral dosage form is a solid form, e.g., tablets and capsules with tablets preferred. The preferred parenteral form is intravenous injection.

The pharmaceutical compositions of this invention can also contain as an optional ingredient one or more peripheral decarboxylase inhibitors by which means a decrease in the amount of active ingredient to be administered is made possible. As the peripheral decarboxylase inhibitors there can be used any pharmaceutically acceptable substance which inhibits the decarboxylase in the extracerebral organs and thereby inhibits the decarboxylation of the active ingredient in these organs. However, those listed above are preferred.

The manner in which the various dosage, i.e., administration, forms which are used in the practice of this invention are prepared will be readily apparent to persons skilled in the art. Standard techniques and procedures and conventional excipients and adjuvants are utilized in their production. In formulating the dosage forms, the active ingredient, either alone or in combination with a decarboxylase inhibitor, can be admixed with inert adjuvants and excipients, either inorganic or organic in nature. Such adjuvants and excipients include, for example, water; gelatin; lactose; dicalcium phosphate; starch; stearic acid; calcium stearate; magnesium stearate; talc; vegetable oils; such as arachis oil; polyalkylene glycols; preservatives; stabilizers; etc. Mixtures of the active ingredient with such excipients and adjuvants can be compressed, for example, into tablets, dragées, etc. or they can be filled into suitable capsules. By using appropriate liquid vehicles, suspensions, emulsions or solutions for parenteral administration can be produced.

A dosage unit generally contains from about 50 mg. to about 1000 mg. of the active ingredient, L - 3 - (4-hydroxy - 3 - methoxyphenyl)-alanine or the equivalent amount of a hydrate or pharmaceutically acceptable salt thereof. Preferably the amount per dosage unit is about 500 mg. to about 1000 mg. of the active ingredient or equivalent amount of a hydrate or pharmaceutically acceptable salt thereof. When the compositions contain a peripheral decarboxylase inhibitor, the proportion by weight of active ingredient to the decarboxylase inhibitor is about 5:1 to 10:1.

If the pharmaceutical composition contains a peripheral decarboxylase inhibitor, it can be admixed with the active ingredient in the unit dosage or the dosage forms can be manufactured by incorporating the active ingredient in a core, providing this with a coating which is resistant to gastric juice causing slow release and applying thereof an external layer which contains the peripheral decarboxylase inhibitor. In this latter manner there is obtained a pharmaceutical composition from which the active ingredient is released after the decarboxylase inhibitor has been released, preferably about 30 to 60 minutes afterwards. This type of pharmaceutical composition has been found to be particularly expedient. In the case of parenteral administration, the decarboxylase inhibitor is first administered, preferably intravenously, and about 30 to 60 minutes later the active ingredient is administered.

The amount of active ingredient administered per day is governed by the needs of the particular case and the judgment of the clinician. In general, in the case of oral administration, an amount of active ingredient from about 1.5 g. to about 4 g., preferably about 3 g., is administered per day. In the case of intravenous application, the amount of active ingredient administered per day can lie between about 50 mg. and about 2 g., preferably about 1 g.

As stated, the amount of active ingredient administered can be lowered by the administration thereof in combination with a peripheral decarboxylase inhibitor. Generally, it has been found that the amount of active ingredient required when combination therapy is used, particularly the oral administration requirements of the active ingredient, are reduced to the lower part of the ranges mentioned above. For example, from 500 to 1000 mg. of active ingredient per 100 mg. of a decarboxylase inhibitor are suitable.

The administration in all cases is preferably effected in equally divided doses over the course of a day. Such doses being determined by the clinician according to the needs in each case.

In order to determine the effectiveness of the pharmaceutical compositions provided by this invention, tablets with a content of 542.7 mg. of L-3-(4-hydroxy-3-methoxyphenyl)-alanine monohydrate [corresponding to a content of 500 mg. of L-3-(4-hydroxy-3-methoxyphenyl)-alanine] were administered to four patients with Parkinson's disease in daily doses of 2 g. to 4 g. Two of these patients were treated for four weeks and two were treated for three weeks. In all four patients, a substantial improvement occurred after about 5 to 11 days of treatment. No undesirable side-effects such as gastorintestinal complaints and circulatory complaints occurred.

Further clinical tests of the compositions on 30 patients with Parkinson's disease also demonstrated that no undesirable side-effects occurred while substantial improvement in the patient's Parkinsonism symptoms occurred.

The following examples illustrate the present invention.

EXAMPLE 1

Tablets are produced in a conventional manner, each of said tablets containing

|   | Mg. |
| --- | --- |
| L-3-(4-hydroxy-3-methoxyphenyl)-alanine monohydrate | 542.7 |
| Avicel* (microcrystalline cellulose) | 147.3 |
| Corn starch | 40 |
| Methylcellulose | 10 |
| Magnesium stearate | 5 |

*American Viscose Corp., Marcus Hook, Pa.

EXAMPLE 2

A hard gelatin capsule wherein the active ingredient is present in a form in which its release is delayed until after the release of a peripheral decarboxylase inhibitor can be manufactured as follows:

A core consisting of 50 mg. of L-3-(4-hydroxy-3-methoxyphenyl)-alanine monohydrate, 8 mg. of corn starch, 15 mg. of lactose, 1.8 mg. of talc and 0.2 mg. of magnesium stearate is coated with a cellulose acetate phthalate lacquer in order to make it resistant to the gastric juices.

A granulate which consists of 5 mg. of $N^1$-L-seryl-$N^2$-(2,3,4 - trihydroxybenzyl) - hydrazide hydrochloride, 5.8 mg. of mannitol and 2.4 mg. of polyvinylpyrrolidone, is prepared in a conventional manner.

The coated core and the granulate are incorporated into a hard gelatin capsule. This composition will release the L-3-(4-hydroxy-3-methoxyphenyl)-alanine active ingredient about 30–60 minutes after the hydrazine component.

EXAMPLE 3

L - 3 - (4 - hydroxy-3-methoxy-phenyl)-alanine monohydrate exemplified as the active ingredient in Examples 1 and 2 can be obtained as follows:

(a) 16.3 g. of D(+)-ephedrine in 100 ml. of acetone are added to a hot suspension of 63 g. of D,L,N-benzoyl-3-methoxytyrosine. The mixture is allowed to stand overnight at room temperature. The crystals which form are separated by filtration and washed with a small quantity of acetone and ether. The resulting salt which is recrystallized from 400 ml. of n-butanol has a melting point of 222–224° C. This salt is shaken in a separatory funnel together with a mixture of 400 ml. of ethyl acetate and 400 ml. of water containing 80 ml. of 1 N hydrochloric acid, until two distinct layers are formed. The ethyl acetate layer is separated, washed twice with water, dried over sodium sulfate and concentrated under reduced pressure. The residue is crystallized from ethyl acetate/ether, to yield L-N-benzoyl-3-methoxy-tyrosine; M.P. 149–152° C.; $[\alpha]_D^{25} = -33°$ (c.=1 in methanol).

(b) A mixture of 200 g. of L-N-benzoyl - 3 - methoxy-tyrosine and 2000 ml. of 3 N aqueous hydrochloric acid are heated for 14 hours at reflux in an argon atmosphere to dissolve all the L-N-benzoyl-3-methoxy-tyrosine. The mixture is cooled to room temperature, then extracted twice each time with 500 ml. of benzene to remove the benzoic acid formed during the reaction. The benzene extracts are washed twice each time with 200 ml. of water. The combined aqueous extracts are concentrated to dryness at 40° C./12 mm. Hg. The residue is dissolved in 500 ml. of water. The resulting brown solution is heated, together with activated charcoal, at about 70° C. for 15 minutes, whereupon it is filtered and the filter residue washed with 400 ml. of water.

The filtrate is combined with the wash water and the pH of the resulting solution is adjusted to 4.5–5 by adding about 200 ml. of a saturated sodium carbonate solution at about 70° C. in an argon atmosphere. The resulting solution is then concentrated to a volume of about 400 ml. by treating at 40° C./12 mm. Hg. The resulting concentrated solution is held at 4° C. for 12 hours. The crystals which precipitate from the solution are recrystallized three times from water, whereby colorless crystals of L - 3 - (4 - hydroxy - 3 - methoxyphenyl)-alanine monohydrate, melting at 229° C. (decomposition) are obtained. On washing these crystals twice, each time with 100 ml. of absolute ethanol and twice, each time with 100 ml. of ether and drying at 50° C./0.05 mm. Hg, there is obtained L - 3 - (4 - hydroxy - 3 - methoxyphenyl)-alanine free from water of hydration, in the form of colorless crystals melting at 233–236° C. (decomposition); $[\alpha]_D^{23} = -5.4°$ (in 1 N HCL, c.=1%).

What is claimed is:

1. A therapeutic composition for treating Parkinsonism comprising an effective anti-Parkinsonism amount of the composition containing as the active ingredients one part by weight of a peripheral decarboxylase inhibitor selected from the group consisting of a compound represented by the formula

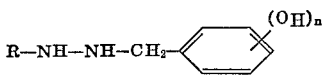

wherein R is hydrogen, amino lower alkanoyl, amino hydroxy lower alkanoyl and amino aryl lower alkanoyl, $n$ is 2 or 3 and a pharmaceutically acceptable salt thereof for each about 5 to about 10 parts by weight of L-3(4-hydroxy - 3 - methoxyphenyl) - alanine or equivalent amount of a hydrate or pharmaceutically acceptable salt thereof.

2. The composition of claim 1 wherein the peripheral decarboxylase inhibitor is $N^1$ - D,L - seryl - $N^2$ - (2,3,4-trihydroxybenzyl) - hydrazide or a pharmaceutically acceptable salt thereof.

3. The composition of claim 1 wherein the peripheral decarboxylase inhibitor is $N^1$ - L - seryl - $N^2$ - (2,3,4-trihydroxybenzyl) - hydrazide or a pharmaceutically acceptable salt thereof.

4. The composition of claim 1 wherein the peripheral decarboxylase inhibitor is $N^1$ - glycyl - $N^2$ - (2,3,4 - trihydroxybenzyl) - hydrazide or a pharmaceutically acceptable salt thereof.

5. The composition of claim 1 wherein the peripheral decarboxylase inhibitor is $N^1$ - D,L - tyrosyl - $N^2$ - (2,3,4-trihydroxybenzyl) - hydrazide or a pharmaceutically acceptable salt thereof.

6. The composition of claim 1 wherein the peripheral decarboxylase inhibitor is $N^1$ - L - tyrosyl - $N^2$ - (2,3,4-trihydroxybenzyl) - hydrazide or a pharmaceutically acceptable salt thereof.

7. The composition of claim 1 wherein the active ingredient is coated with a pharmaceutically acceptable inert, slow release gastric juice resistant coating which releases the ingredient upon oral administration about 30–60 minutes after release of the peripheral decarboxylase inhibitor.

8. A method of treating Parkinsonism which comprises administering to a patient afflicted with that condition an effective dosage of, as the active ingredient, a combination containing one part by weight of a perpheral decarboxylase inhibitor selected from the group consisting of a compound represented by the formula

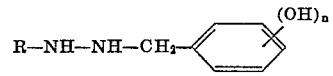

wherein R is hydrogen, amino lower alkanoyl, amino hydroxy lower alkanoyl and amino aryl lower alkanoyl, $n$ is 2 or 3 and a pharmaceutically acceptable salt thereof for each about 5 to about 10 parts by weight of L-3-(4-hydroxy-3-methoxyphenyl)-alanine or equivalent amount of a hydrate or pharmaceutically acceptable salt thereof.

9. The method of claim 8 wherein L - 3 - (4-hydroxy-3 - methoxyphenyl) - alanine, a hydrate, or a pharmaceutically acceptable salt thereof is administered about 30–60 minutes after the administration of the peripheral decarboxylase inhibitor.

References Cited

Brain Research, 4 (1967) pp. 103–106.
Chem. Abst., 45, p. 3415c and 476h (1952).

STANLEY J. FRIEDMAN, Primary Examiner

U.S. Cl. X.R.

424—326